United States Patent

Valyi

[11] 4,115,494
[45] Sep. 19, 1978

[54] METHOD FOR CONTROLLED PROCESSING OF BLOWN PLASTIC ARTICLES

[76] Inventor: Emery I. Valyi, 5200 Sycamore Ave., Riverdale, N.Y. 10471

[21] Appl. No.: 641,638

[22] Filed: Dec. 17, 1975

Related U.S. Application Data

[60] Division of Ser. No. 479,287, Jun. 14, 1974, Pat. No. 3,970,419, and a continuation-in-part of Ser. No. 473,580, May 24, 1974, Pat. No. 3,966,378.

[51] Int. Cl.² .............................................. B29C 17/07
[52] U.S. Cl. ........................................ 264/89; 264/94; 264/97
[58] Field of Search ...................... 264/89, 94, 97-99, 264/296; 425/DIG. 208, DIG. 211, DIG. 213, DIG. 215, DIG. 234, 523, 526, 530, 533, 534

[56] References Cited

U.S. PATENT DOCUMENTS

| | | | |
|---|---|---|---|
| 2,359,216 | 9/1944 | Hofmann et al. | 425/DIG. 208 |
| 3,325,862 | 6/1967 | Mehnert | 264/98 X |
| 3,364,521 | 1/1968 | Valyi | 264/97 X |
| 3,776,991 | 12/1973 | Marcus | 264/89 |
| 3,819,314 | 6/1974 | Marcus | 425/DIG. 213 |
| 3,873,660 | 3/1975 | Reilly et al. | 264/89 |
| 3,944,643 | 3/1976 | Sato et al. | 425/DIG. 208 |

Primary Examiner—Jan H. Silbaugh
Attorney, Agent, or Firm—Robert H. Bachman

[57] ABSTRACT

A method and apparatus for forming hollow objects of moldable organic plastic material by providing a parison on a blow core, locating said blow core bearing said parison in a blow mold, expanding said parison within said blow mold, separating said expanded parison from said blow core while the parison remains in said blow mold and transferring said expanded parison from said blow core within said blow mold to another core and/or blow mold. In a preferred embodiment, a plurality of cores and molds are employed to provide an extended cooling sequence for the final article.

31 Claims, 14 Drawing Figures

FIG-10

METHOD FOR CONTROLLED PROCESSING OF BLOWN PLASTIC ARTICLES

CROSS REFERENCE TO RELATED APPLICATIONS

This is a Division, of application Ser. No. 479,287, filed June 14, 1974 now U.S. Pat. No. 3,970,419.

The present invention is a continuation-in-part of copending application Ser. No. 473,580, filed May 24, 1974, now U.S. Pat. No. 3,966,378 by Emery I. Valyi, for METHOD AND APPARATUS FOR MAKING ORIENTED HOLLOW PLASTIC ARTICLES.

BACKGROUND OF THE INVENTION

This invention relates to the art of blow molding articles of organic plastic material from a parison and has as its principal object the provision of improved hollow articles in an ecomonical, expeditious manner.

The art teaches various methods and apparatus for obtaining blow molded articles of organic plastic material from a parison, such as in U.S. Pat. No. 3,349,155 and Re. 27,104. Generally, these methods are characterized by forming a parison in a parison mold on a blow core, placing said formed parison and blow core into a blow mold and expanding said parison in the blow mold by means of fluid pressure. After blowing the parison into the form of the hollow article in the blow mold, the blow core is separated from the article and the blow mold with the blown article therein is transferred to a discharge station.

Certain disadvantages exist in the practice of the foregoing methods. The finally expanded articles, particularly those with walls of substantial thickness, tend to require support during an extended cooling period before they can be safely discharged from the mold. If the cooling step is inadequate, the articles will tend to deform. On the other hand, the cooling time of thick-walled articles tends to be long, and the blow mold would therefore be engaged during such a cooling step, rather than available for participation in the expansion of another article.

In other instances, for example, when molding polyesters, the expansion is preferably carried out in more than one step, each step occurring at different temperatures, which introduces an additional time interval during which the blow mold is unavailable to produce another aticle.

SUMMARY OF THE INVENTION

In accordance with the present invention, a method is provided for the preparation of hollow articles from moldable organic plastic material which comprises providing a parison on a blow core, locating said blow core bearing said parison in a blow mold, expanding said parison within said blow mold, and transferring said expanded parison from said blow core within said blow mold to at least one retaining mold in which its temperature may be changed.

If it is desired to produce a multi-layered parison, the core may first be provided with a layer of one plastic, and a subsequent layer may then be pressure molded therearound, in accordance with my U.S. Pat. Nos. 3,349,155, 3,717,544 and 3,719,735. While the general description that follows refers simply to parisons, it is understood that the method and apparatus of the present invention are applicable to multi-layered as well as single-layered parisons. In this regard, further description is provided below for various such modifications within the scope of this invention.

The apparatus of the present invention includes a core, means for providing a parison thereon, a blow mold having a cavity corresponding to the shape of the desired hollow object, means for expanding said parison to form said hollow object on said blow core within said blow mold, at least one retaining mold in spaced relationship to said blow mold, and means for transferring said hollow object to said retaining mold.

The method and apparatus of this invention offer the advantages of providing for the continuous, expeditious blow molding of hollow articles, together with a controllable cooling of the final articles which is adjustable to the requirements of specific products and materials.

Among the plastics that can be processed in accordance with the present invention are polystyrene, polyvinyl chloride, polyolefins, such as polyethylene and polypropylene, polyesters, polyamides, polyimides, acrylics such as the acrylates and methacrylates, acrylonitrile and methacrylonitrile polymers and others.

Accordingly, it is a principal object of the present invention to provide a method for the preparation of hollow articles from moldable organic plastic material which is both economical and expeditious.

It is a further object of the present invention to provide a method as aforesaid which affords extended processing of the molded article conjointly with the molding process.

It is yet a further object of the present invention to provide an apparatus for use in the method as aforesaid which enables the several steps to be conducted concurrently.

Other objects and advantages will be apparent to those skilled in the art from the description which follows with reference to the following drawings.

DETAILED DESCRIPTION OF THE PREFERRED EMBODIMENTS

Figures 1, 2A:
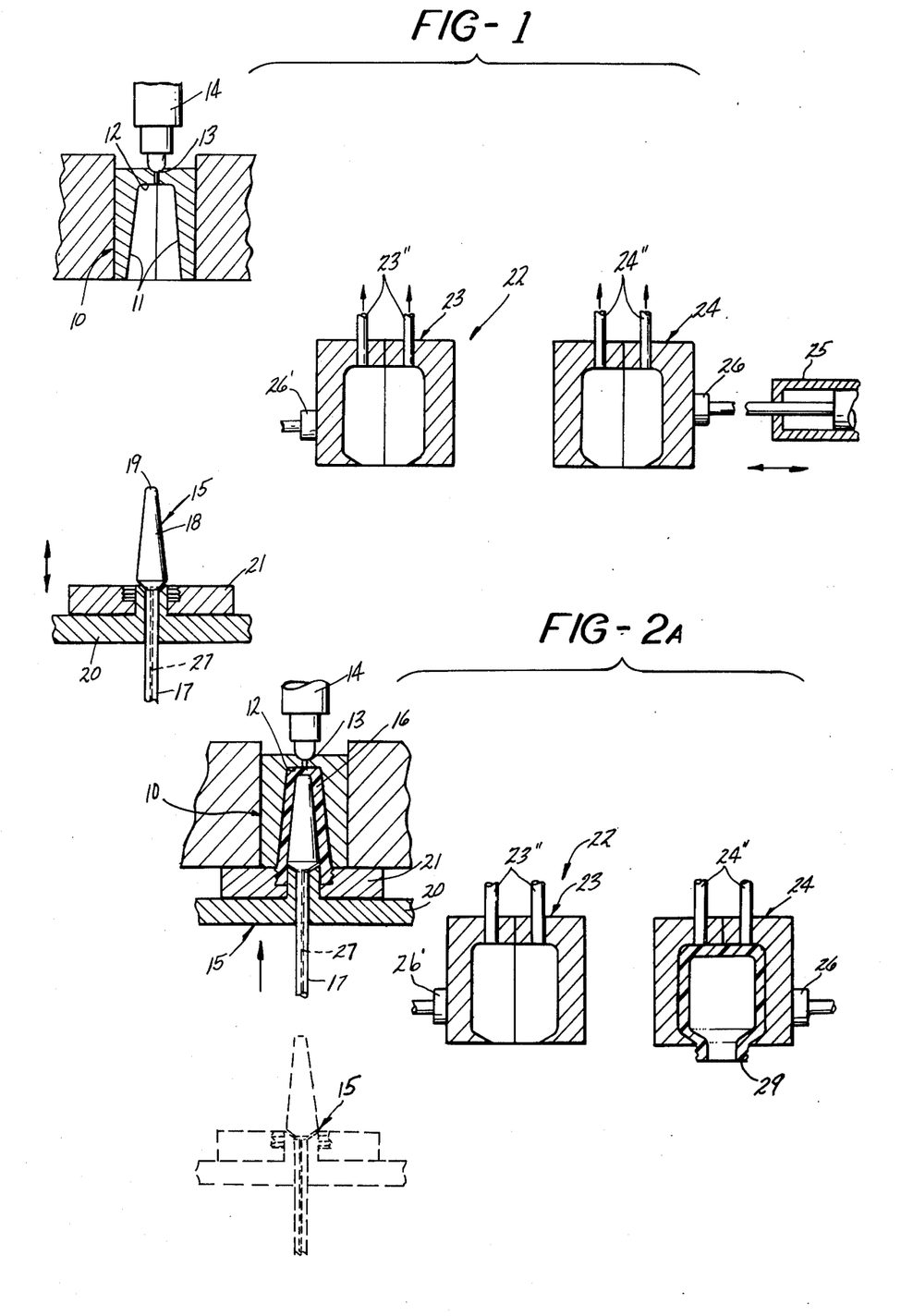
FIG. 1 is an elevation, partly in section illustrating an apparatus in accordance with this invention.
FIGS. 2A - 2C are elevations partly in section with additional portions in phantom showing a sequence of operations according to the embodiment of FIG. 1.

Referring to the drawings in more detail, FIG. 1, and 2A – 2C illustrate an apparatus in accordance with one embodiment of the present invention. In this embodiment, the parison is provided by an injection molding process, however, the invention is not limited thereto and includes other known molding processes that are capable of producing parisons such as compression molding, casting, extrusion with or without secondary operations, and the like. FIG. 1 depicts a parison die 10, having outer walls 11 which may be separable, depending upon the shape of the parison and which are adapted to form the outer surface of the parison, and having an end wall 12 shaped to form the end wall of the parison. The end wall 12 of the parison die has an injection nozzle 13 registering with an injection unit 14 through which the organic plastic material is injected into the parison die. The parison die 10 is shown as split for convenience in opening to release the formed parison, however, it should be understood that the invention is not limited thereto, as unparted dies are encompassed herein.

As indicated hereinabove, the plastics contemplated in accordance with the present invention are polystyrene, polyvinyl chloride, polyolefins, such as polyethylene and polypropylene, polyesters, polyamides, polyimides, acrylics such as the acrylates and methacrylates, acrylonitrile and methacrylonitrile polymers, and other thermoplastic materials.

The formation of the parison in accordance with the embodiment illustrated in FIGS. 1, and 2A – 2C takes place after a blow core 15 illustrated in FIG. 1, and set forth in phantom in FIG. 2A, and die 10 are brought into engagement. Upon completion of injection by means of injection unit 14, a parison 16 having, for example, the configuration represented in FIG. 2A, is formed.

Blow core 15 comprises a mandrel 17 which provides a side wall 18 and an end wall 19 for the formation with walls 11 and 12 of parison die 10, of a die cavity in which the parison is formed. A neck mold 21 may be used with blow core 15, in continuation of the die cavity. Blow core 15 is carried by platen 20. Neck mold 21 continues to engage the parison while the latter is on blow core 15 after disengagement from parison die 10. Neck mold 21 may be split and opened into two portions by suitable mechanical means, not shown, to release the parison, or, if the configuration of the neck permits, may be of one-piece construction and, thus, separable from the parison as a unit. In the embodiment illustrated in FIGS. 1, and 2A – 2C, neck mold 21 possesses threads to produce a threaded neck in the final molded object.

Blow core 15, die 10 or mold assembly 22 may also be provided with actuating means, not shown, for moving them into and out of engagement with each other, as will be discussed hereinafter. The actuating means may be those which are conventionally employed in the art, such as, for example, hydraulic cylinders, and the present invention is not limited thereby.

Figure 2B:
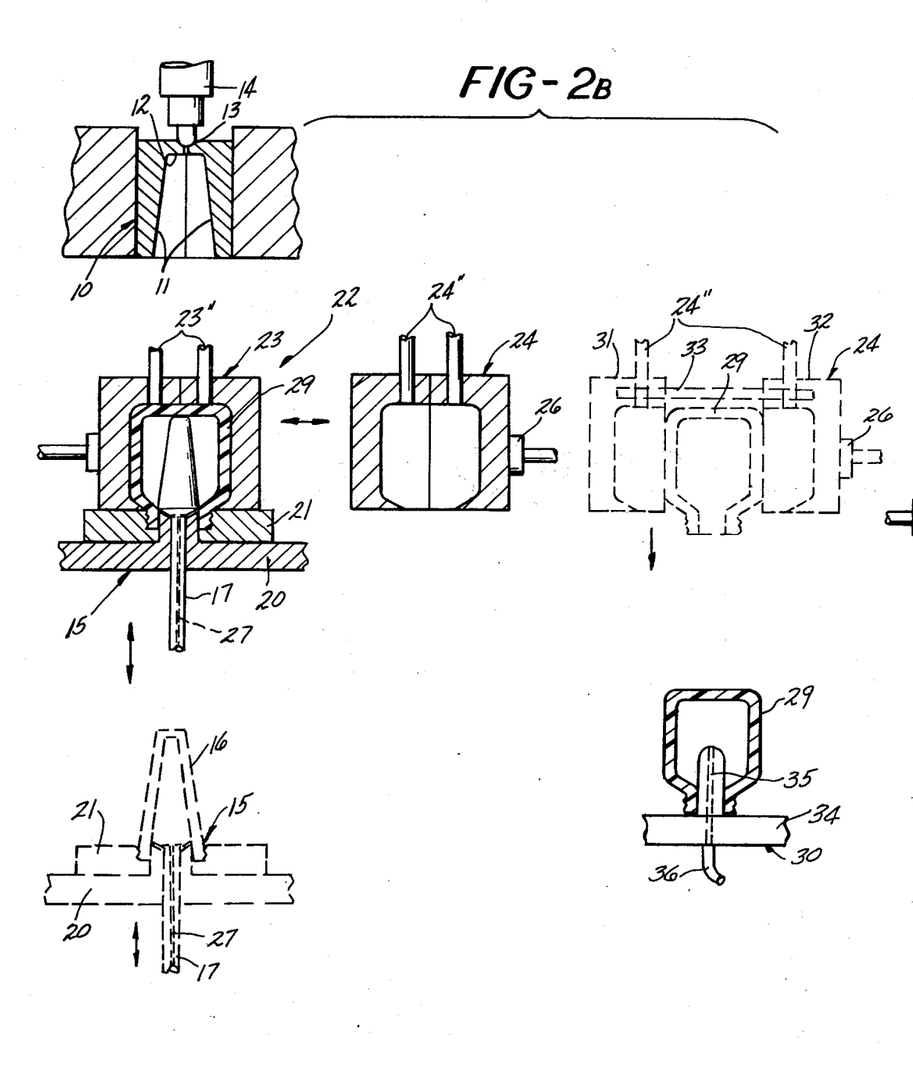

Upon separation of the parison die 10 and the blow core 15 bearing parison 16, the latter assumes the position depicted in FIG. 1 and shown in phantom in FIG. 2B. Mold assembly 22 which comprises a blow mold 23 and a retaining mold 24, and blow core 15 are brought into alignment so as to juxtapose blow mold 23 and parison 16, illustrated, as noted earlier, in phantom in FIG. 2B. Blow mold 23 and retaining mold 24 are maintained in integral spaced relationship and, in one embodiment of the invention, may be joined by a connecting member, not shown. Both mold 23 and mold 24 are arranged for reciprocation, for example, by means of hydraulic cylinders such as the structure labeled 25 in FIG. 1 and depicted in communication with mold 24 by attachment 26. A similar hydraulic cylinder, not shown, may communicate with mold 23 by attachment 26' schematically indicated thereon. The assembly may be supported for traverse between the positions suggested in FIGS. 2A – 2C, by conventional means, such as tie bars or rails, not shown herein. Assembly 22 as discussed above, is merely illustrative of one embodiment of this invention and is capable of modification in design and operation, as will be illustrated further on.

Referring now to FIG. 2B, following the alignment of blow mold 23 and core 15 bearing parison 16, as noted earlier, blow core 15 and parison 16 are then located within blow mold 23, for example, in the manner indicated in the figure.

Other means of bringing parisons and blow molds together may be used and are well known, such as those disclosed in U.S. Pat. Nos. 2,853,736 and 2,974,362, it being understood that the relative locations of the several elements in FIGS. 1 and 2A – 2C are illustrative only, the principles of their operation not being limited thereby, and applicable to further modifications, such as the side-by-side or circumferential location of said elements, as shown in the patents.

The parison is then expanded into conformity with the cavity of blow mold 23, whose temperature may, in a further embodiment, be controlled by conventional means, not shown, to optimize the expanded parison temperature for possible subsequent operations possessing such requirements such as, for example, axial extension. Also, the parison is thereby freed from blow core 15. As illustrated in the figures, expansion is conventionally achieved by the provision of fluid under pressure through passages 27 provided within blow core 15 for that purpose. FIG. 2B illustrates the extent of expansion as the perimeter of the unexpanded parison 16 is represented in phantom and the expanded article resulting from the exertion of fluid pressure within parison 16 is labeled 29.

After completion of the expansion of the parison, blow mold 23 and blow core 15 are separated, and the expanded article, i.e., article 29, is retained by blow core 15. Removal of article 29 from blow mold 23 may be accomplished in any of several ways known in the art. In the figures, blow mold 23 and retaining mold 24 are shown as split to receive and release the expanded parison, however, it should be understood that the invention is not limited thereto; the shape of the expanded parison permitting, one-piece molds may be employed and are encompassed herein.

Figure 2C:
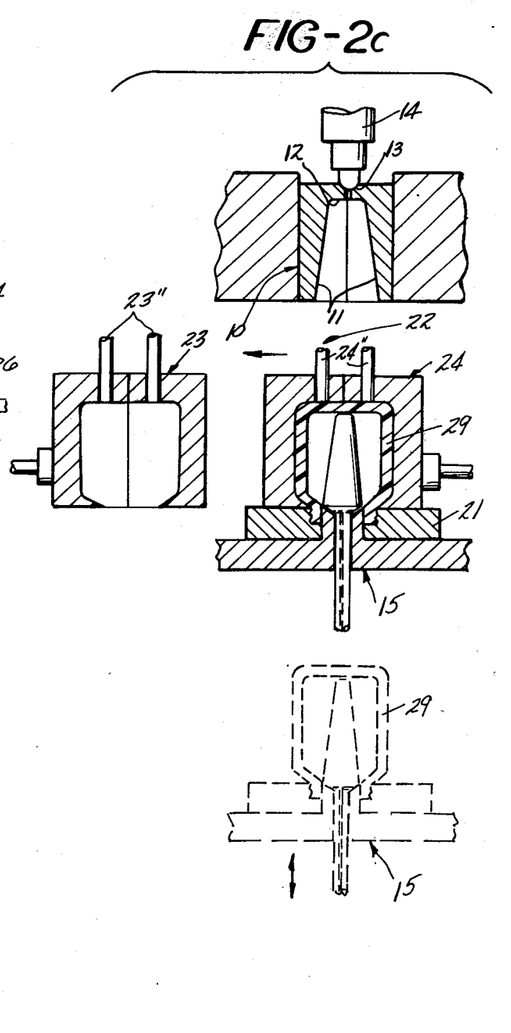

Upon removal from blow mold 23, blow core 15 bearing parison 29 returns to the position depicted in phantom in FIG. 2C for the transfer of article 29 to retaining mold 24. As illustrated in FIG. 2C, mold assembly 22 is laterally shifted so as to juxtapose retaining mold 24 and blow core 15, however, other methods and means of aligning blow core 15 and retaining mold 24 are contemplated within the skill of the art, such as, for example, the lateral transfer of core 15 into juxtaposition with mold 24 as the latter is situated in FIG. 2B. Accordingly, the invention should not be limited to the manner of transfer illustrated in FIG. 2C. Blow core 15 is then received within retaining mold 24, in a manner known in the art. Retaining mold 24 and blow core 15 are then separated and article 29 is retained within mold 24. Disengagement of article 29 may require either the opening or removal of neck mold 21. Blow core 15 is then returned to the starting position illustrated in FIG. 1, and mold assembly 22, including retaining mold 24 containing article 29, is shifted laterally into the position illustrated in FIGS. 1 and 2A.

Once in retaining mold 24, article 29 may undergo extended cooling or other thermal treatment, continuing and/or supplementing the treatment commenced while article 29 was in mold 23 without occupying either mold 23 or core 15, and thus enabling both of the latter to engage in the formation of additional molded objects. This forms the primary feature of the invention, as the parison may be given an extended thermal treatment in retaining mold 24 without interrupting or otherwise delaying the formation of additional parisons and their expansion into hollow objects. Thus, for example, the parison may be exposed to a controlled heating schedule in the manner outlined in my copending application Ser. No. 473,580, which is incorporated herein by reference, to promote the assumption of a preferred orientation in certain plastics. Likewise, the retaining mold may provide controlled cooling cycle for materials which require specific treatment of that nature. Referring again to the figures, article 29 is permitted to reside within retaining mold 24 from the time that transfer is effected, as shown in FIG. 2C to the time that mold assembly 22 is moved laterally into position so as to juxtapose blow mold 23 and core 15, as shown in FIG. 2B.

It is well known that cooling or other thermal treatment, such as in molds 23 and 24 is fully effective only if the article 29 whose temperature is to be controlled is in surface contact with the walls of said mold. The wall surfaces of the molds may, of course, be subject to temperature control by conventional means, such as by circulating heating or cooling fluid through channels within said mold walls, not shown, or by means of electric resistance heaters or Peltier-effect cooling devices contained therein. To assure such surface contact, even while article 29 tends to shrink away from the mold walls due to contraction in cooling, a pressure differential may be established between the inside of article 29 and the space between said article and the inner walls in molds 23 and 24 for at least part of the time that article 29 resides within said molds. Such pressure differential may be maintained by evacuating the said space, as by applying a vacuum by means of a pump, not shown, through conduits 23" and 24", respectively, thereby causing atmospheric pressure within article 29 to hold its walls in contact with the temperature controlled surfaces of molds 23 and 24. Alternately or additionally, air pressure may be applied within article 29 other than by means of blow core 15 as above described, as, for example, from an external blow tube or blow cap well known in the art.

FIG. 2B illustrates the removal of parison 29 from retaining mold 24, illustrated in phantom, and the transfer of parison 29 to carrier assembly 30. As noted above, retaining mold 24 is illustrated as split, and thus, separates into two sections labeled 31 and 32, which reciprocate in and out of communication along connecting means 33, by an actuating means, not shown, such as, for example, a hydraulic cylinder.

Thus, upon discontinuing the vacuum applied through conduits 24" and the application of pressure, if any, within article 29, and the separation of sections 31 and 32, article 29 is freed from mold 24 and may, be placed upon a device to transfer it to a next operation. For example, a transfer carrier assembly 30 may be used, as noted above. Carrier assembly 30 may, for example, comprise a platform 34 which supports an appropriately dimensioned expandable transfer finger 35 connecting to a source of fluid by line 36 which is placed into the opening located in the neck of parison 29, such as that which is disclosed in my U.S. Pat. No. 3,587,133.

Figure 8:
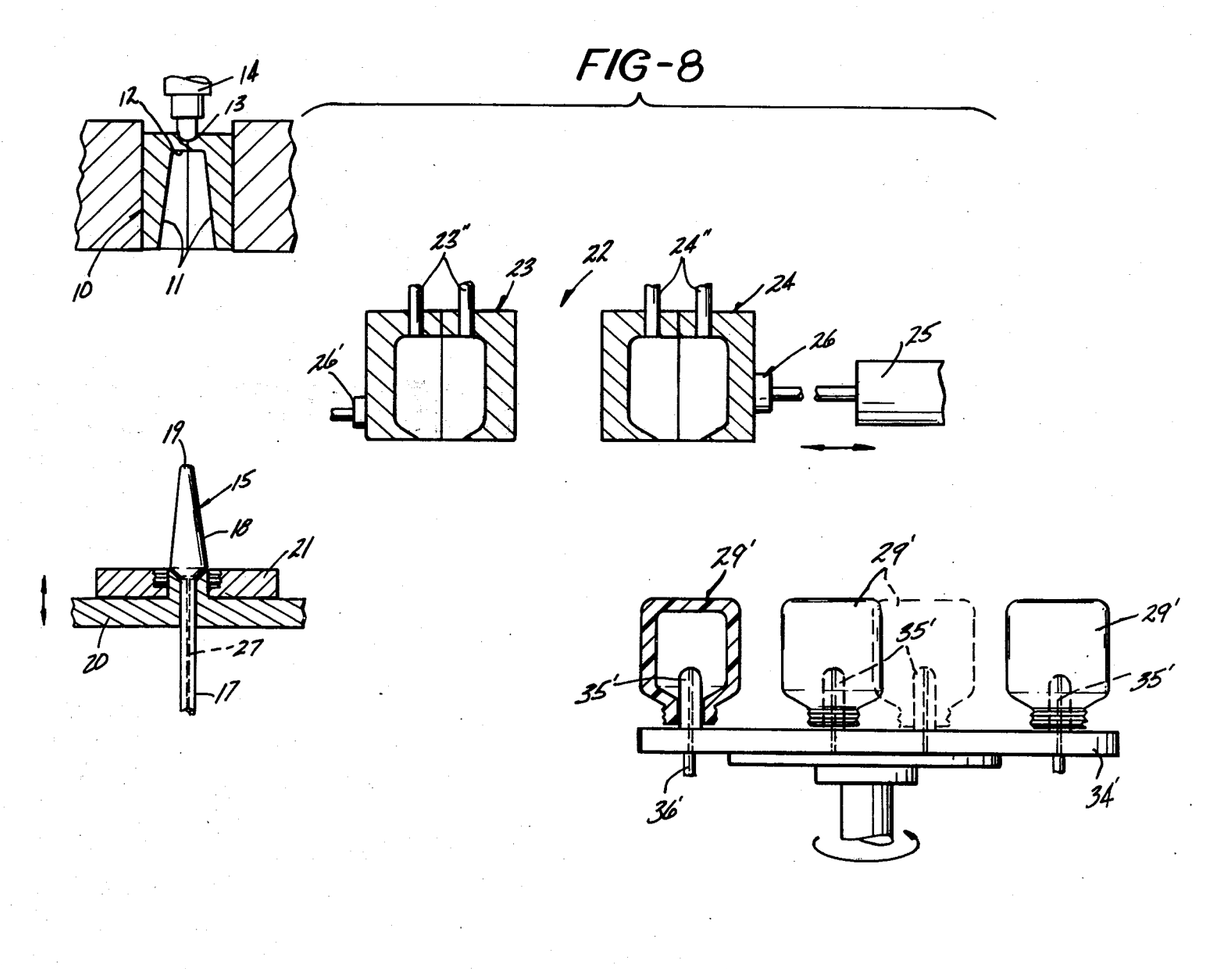
FIG. 8 shows rotary indexing removal fingers employed in accordance with this invention.

In a further embodiment disclosed in the aforementioned U.S. Patent and depicted in FIG. 8, the carrier assembly may comprise a rotary platform 34' which carries a plurality of transfer fingers 35' which are arranged to index from a position of alignment with retaining mold 24 to a position of final removal of completed articles 29'. This arrangement is particularly useful with parisons which, though removable from the retaining mold, still are insufficiently cooled to be handleable, as it provides a further extension of the cooling cycle.

though a method and apparatus have been described above with reference to the preparation of single-layered parisons by injection or other pressure molding in a parison die, and exposing said parisons immediately to the further steps of the process, a wide variety of modifications may be employed within the scope of this invention.

Figure 5:
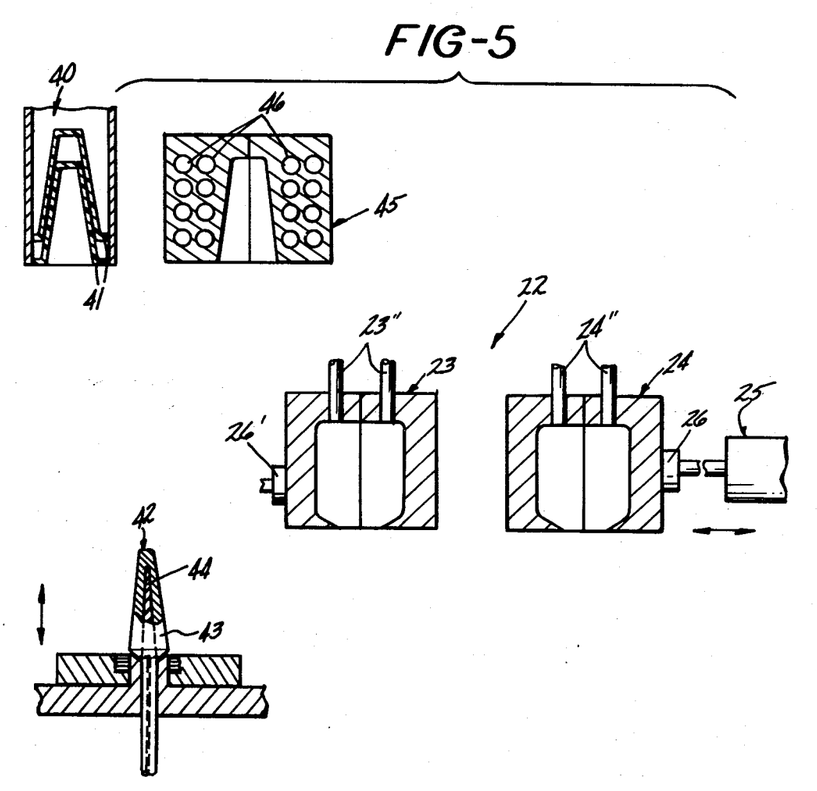
FIG. 5 is an elevated view, partly in section illustrating an alternate apparatus for providing a parison according to the method of this invention.

In one modification, the parison may be formed earlier at a time and location of its own, and stored before being formed into the final object. In addition to injection molding, numerous methods are known that may be employed to provide thermoplastics in the shape of a parison, such as tube extrusion with welding of one open end, dipping, deposition, thermoforming and the like. Thus, the previously produced parison may be transported to and placed upon a first blow core which may cooperate with a heating means to raise the temperature of the parison sufficiently to enable it to undergo deformation. Alternately, a previously heated parison may be placed upon the blow core. An apparatus of this type is shown in FIG. 5, wherein dispenser 40 contains a quantity of previously formed parisons 41 which are singly released upon engagement with core member 42. Core member 42 substantially resembles blow core 15 in FIG. 1, with the feature that mandrel 43 contains heating means 44 which may be an electric cartridge heater or a passage containing heating fluid maintained at an elevated temperature by external heating means, not shown.

In addition to heated core member 42, a heating mold 45 may be employed to heat the outer surface of the parison when in engagement therewith. Mold 45 is conveniently located, as for example, in the same horizontal plane as dispenser 40 and in spaced relation thereto. Generally, mold 45 may occupy the same position as parison die 10 in FIG. 1. Core member 42 is adapted to reciprocate laterally as well as axially, so as to be alternately aligned with dispenser 40 and heating mold 45. Heating mold 45, like core member 42, may possess electric or fluid heaters 46 suitably placed to heat its inner walls for transmitting heat to a parison placed into contact therwith. Conventional temperature regulators are used to control the heating means of core 42 and mold 45 individually. Core member 42 and heating mold 45 may be held together under enough pressure with a parison between them to assure that the parison is efficiently brought to temperature for subsequent deformation.

Figure 6:
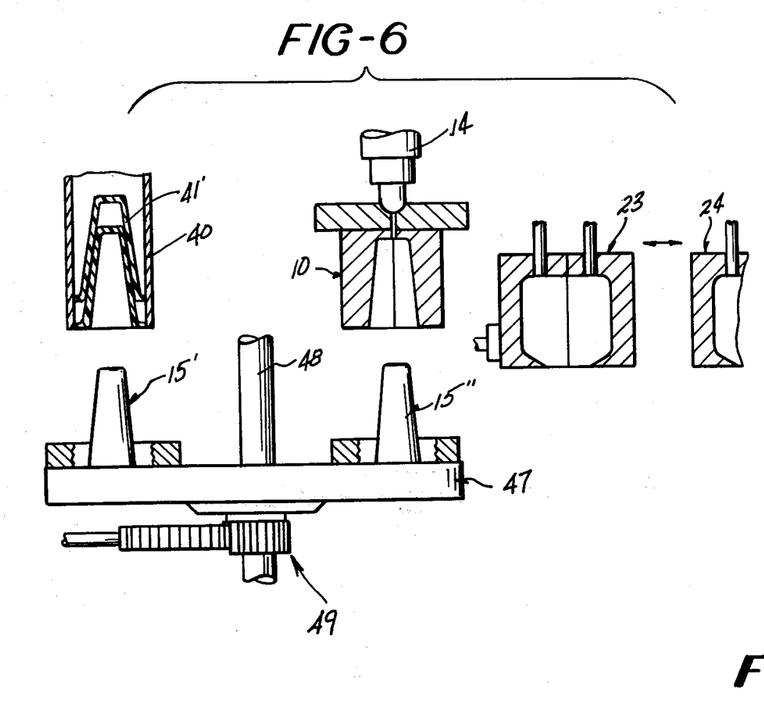
FIG. 6 is an elevated view which shows an apparatus for the preparation of lined and composite parisons.

As noted earlier, the method and apparatus of this invention are easily adapted for the preparation of composite and lined hollow objects as, for example, described in my U.S. Pat. No. 3,737,259. In the embodiment shown in FIG. 6, dispenser 40 is shown in horizontal alignment with parison die 10, and both are in vertical alignment with platform 47 carrying diametrically opposed blow cores 15' and 15", respectively, in all respects structurally conforming with first blow core 15 in FIG. 1. Platform 47 is adapted to reciprocate cores 15' and 15" into and out of engagement with dispenser 40 and die 10, on vertical rod 48, and is rotatably reciprocable by an actuating means, not shown, which cooperates with rack-and-pinion linkage 49. Thus, in operation, platform 47 is raised to simultaneously engage dispenser 40 and die 10, and core 15' receives a preform 41' which may be either a parison or a liner. Platform 47 is then lowered and, after transfer of the hot parison to blow mold 23, it is rotated 180°. Core 15' carrying a preform 41', is thus brought into engagement with die 10. If pre-form 41' is a liner, injection therearound of a subsequent layer takes place next. If pre-form 41' is a parison, die 10 serves merely to heat same to forming temperature, as the heating mold 45, above. As shown in FIG. 6, platform 47 and die 10 are spatially disposed to facilitate transfer of the composite or lined parison from core 15' to mold 23 in accordance with the embodiment illustrated in FIGS. 2A – 2C. The details of this apparatus are disclosed in my U.S. Pat. No. 3,737,259, issued June 5, 1973, and are incorporated herein by reference.

It is understood that, whenever previously produced parisons are employed, as, for example, in the embodiment according to FIG. 5, such parisons may be provided with an inside coating or liner, and, as such, may be multi-layered.

Figure 7A:
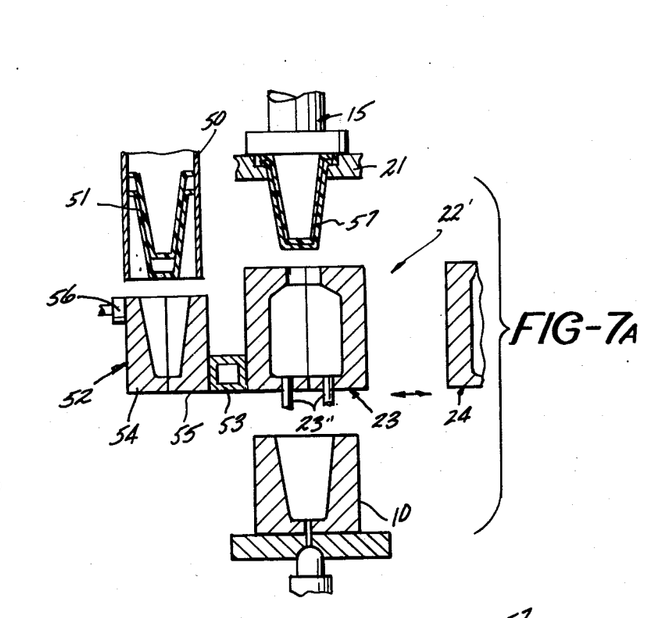
FIG. 7A and 7B show an apparatus and sequence of steps illustrating an alternate preparation of lined and composite parisons.
Figure 7B:
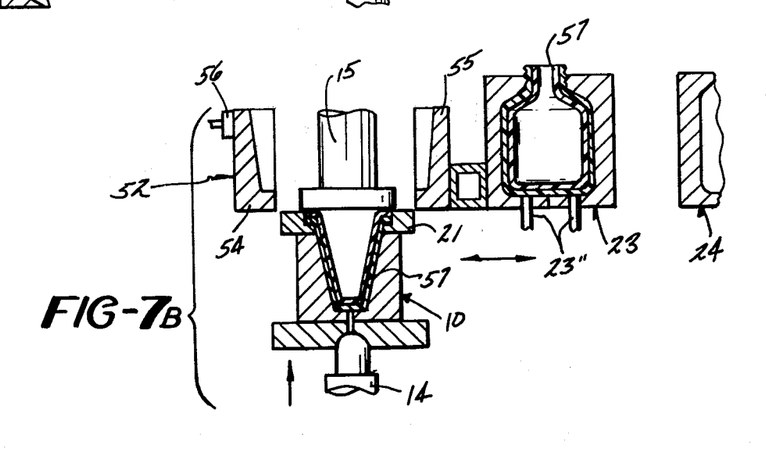

An alternate embodiment for the preparation of composite or line objects is shown in FIGS. 7A and 7B. In this embodiment, the apparatus is operative in the inverse direction from that of FIG. 1 – 2C. The apparatus comprises a liner or parison dispenser 50 which is adapted to periodically release a parison or liner 51 into carrier assembly 52. Carrier assembly 52, which comprises a receptacle, is connected to blow mold 23 by connecting member 53. The entire assembly 22' including retaining mold 24, is laterally reciprocable and, upon the placement of a liner or parison in carrier assembly 52, is moved so as to align carrier assembly 52 with blow core 15. Blow core 15 and parison die 10 are related here in the same manner disclosed in FIGS. 1 – 2C, except that, whenever a previously made parison is used, die 10 is a heating die as shown in FIG. 5, and, of course, is not in engagement with an injection nozzle. At the injection or heating step, as the case may be, shown in FIG. 7B, blow core, carrier assembly and die are in alignment.

In order to inject or heat the parison, blow core 15 is brought into engagement with carrier assembly 52 to receive parison or liner 51. The parison or liner 51 may also be engaged by neck mold 21 in the manner disclosed with reference to FIGS. 1 – 2C, above. Upon receiving the parison or liner 51, core 15 continues its movement to engage die 10 to be heated, or surrounded by another layer of injected plastic, as the case may be.

Carrier assembly 52 is divided into sections 54 and 55 which are adapted to part in response to an actuating means, not shown, which is connected to section 54 at 56. Thus, as shown in FIG. 7B, carrier assembly 52 parts to allow core 15 with the parison or liner thereon, to extend into die 10. By suitable linking of the movements of core 15 and sections 54 and 55, the core may thus be moved without pausing to await separation of sections 54 and 55.

After injection or heating is completed, core 15 and die 10 are separated and core 15 returns to the position depicted in FIG. 7A. Sections 54 and 55 of carrier assembly 52 are reunited and assembly 22' is laterally shifted so that carrier assembly 52 and dispenser 50 are juxtaposed while blow mold 23 is readied to receive core 15 bearing composite parison 57. Upon placement of composite 57 in mold 23, the cycle is carried forward, as, for example, described in connection with FIGS. 1, and 2A – 2C.

In addition to modifications such as the above, relating to the type of parison provided and the manner of its provision, there is contemplated a further modification dealing with the manner of transferring the expanded parison, i.e., the article 29, from a blow mold to a retaining mold. Thus, as disclosed in my copending application Ser. No. 473,580, the disclosure of which is incorporated herein by reference and illustrated herein in FIGS. 3, 4A and 4B, a transfer core assembly 58 is provided which is situated in the same spaced relationship to blow core 15 as exists between blow mold 23 and retaining mold 24. This enables both cores to engage a respective mold when core 15 is aligned with mold 23, and allows the concurrent pursuit of both the forming and transfer operations as well as those of expanding and cooling or otherwise controlling the temperature of the formed parison.

Transfer core assembly 58 comprises a mandrel 61 adapted to support article 29 during transfer between blow mold 23 and retaining mold 24, which is supported upon platen 59 for reciprocation in the same manner as core 15. Also, core assembly 58 may be provided with a neck mold 60 for retaining the neck of the expanded parison in position during transfer. Though core assembly 58 is shown as being similar in size, shape and operation to blow core 15, the invention is not limited thereto, as other retaining devices known in the art, such as carrier assembly 30 in FIG. 4A, may be employed.

Figure 3:
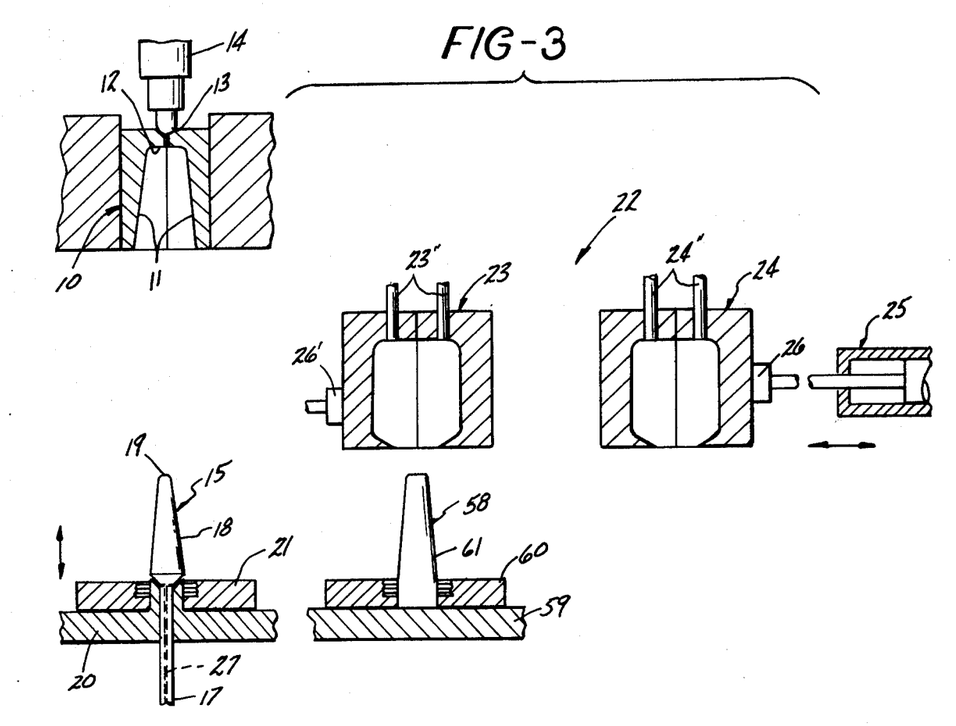
FIG. 3 is an elevation, partly in section illustrating an alternate embodiment of this invention.
Figure 4A:
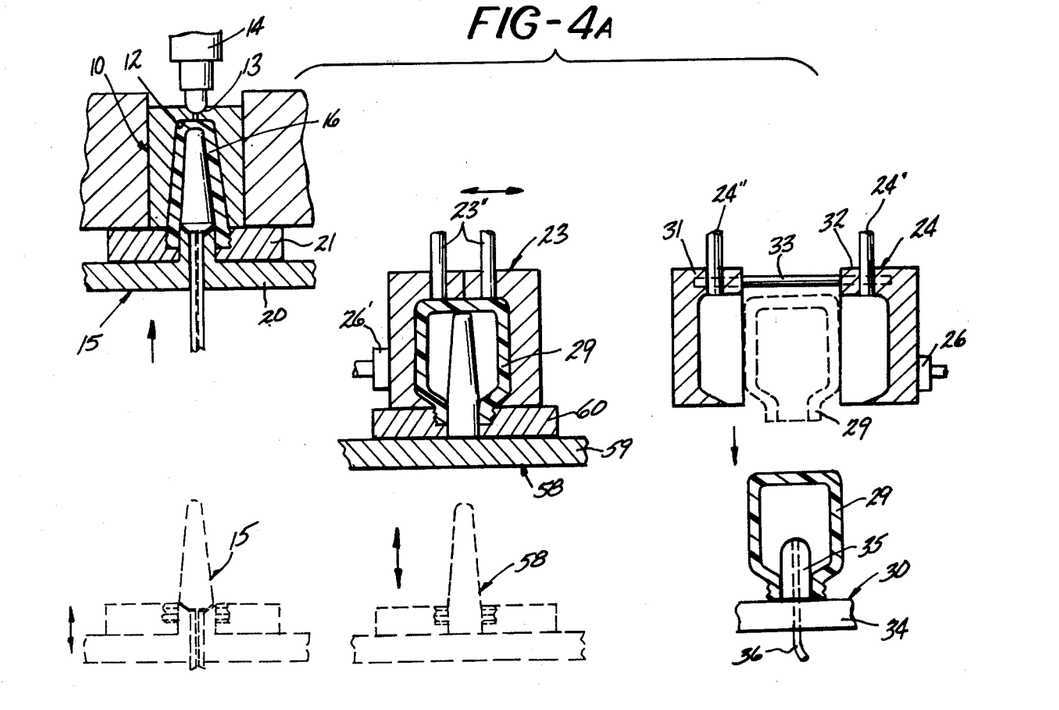
FIGS. 4A and 4B are views similar to FIG. 3 with additional portions in phantom showing a sequence of operations according to an embodiment of the method of this invention.
Figure 4B:
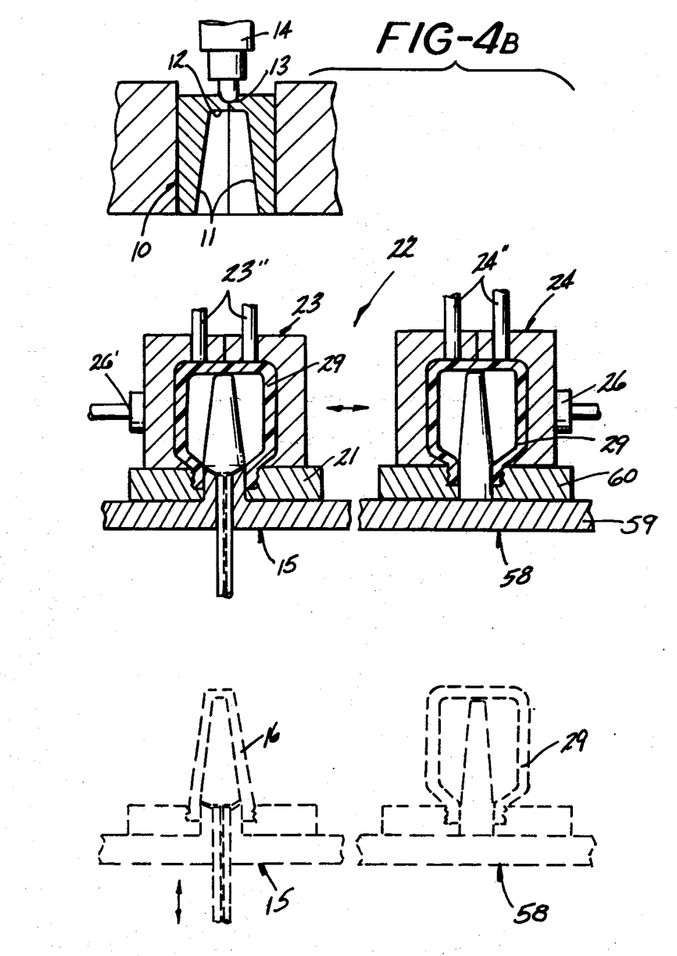

The method of this embodiment may be similar to that disclosed in FIGS. 1 and 2A – 2C, in that the parison may be provided on core 15, for example, by formation in die 10 and then expanded into conformity with the cavity of blow mold 23, forming article 29 as shown in both FIGS. 2B and 4B. At this point, however, core 15 separates from both mold 23 and article 29, which is at the same time released from neck mold 21, whereby article 29 is retained within mold 23. Upon the return of core 15 to the position shown in FIG. 3, and depicted in phantom in FIG. 4A, mold assembly 22 carrying mold 23 laterally shifts back into the position illustrated in FIG. 3, rather than that which it assumes in FIG. 2C, and core assembly 58 and neck mold 60, if used, engage article 29 while within mold 23, while core 15 engages die 10 for the formation of another parison.

Article 29 is then transferred from mold 23 solely onto core assembly 58 by the separation of mold 23 into sections or other means known in the art as discussed previously, placing it into the position shown in phantom in FIG. 4B, whereby core 15 bearing a parison, and core assembly 58 bearing a blown article, assume the respective positions occupied in FIG. 3 and shown in phantom in FIG. 4B. Mold assembly 22 is next positioned so as to juxtapose the respective molds and cores, and core assembly 58 thus engages retaining mold 24 as core 15 engages blow mold 23. During such engagement, pressure may be maintained within article 29 in mold 23 and 24 by pressure fluid applied through core 15 and, if adapted therefor, assembly 58, respectively, to keep article 29 in surface contact with molds 23 and 24, aided, if necessary, by vacuum applied through conduits 23″ and 24″. If more than one retaining mold 24 is needed, additional such molds may be attached to mold assembly 22 and correspondingly thereto, additional core assemblies like core assembly 58 may be provided, so that article 29 may be transferred from core to core and from mold to mold in the same manner as described herein in connection with cores 15 and 58, and molds 23 and 24.

Core assembly 58 and retaining mold 24 containing article 29 may be separated in the manner discussed with reference to core 15 and retaining mold 24 earlier. Article 29 is removed from retaining mold 24 at the end of the cycle, likewise in the manner described earlier with reference to FIG. 2B, and need not be repeated.

Figure 9:
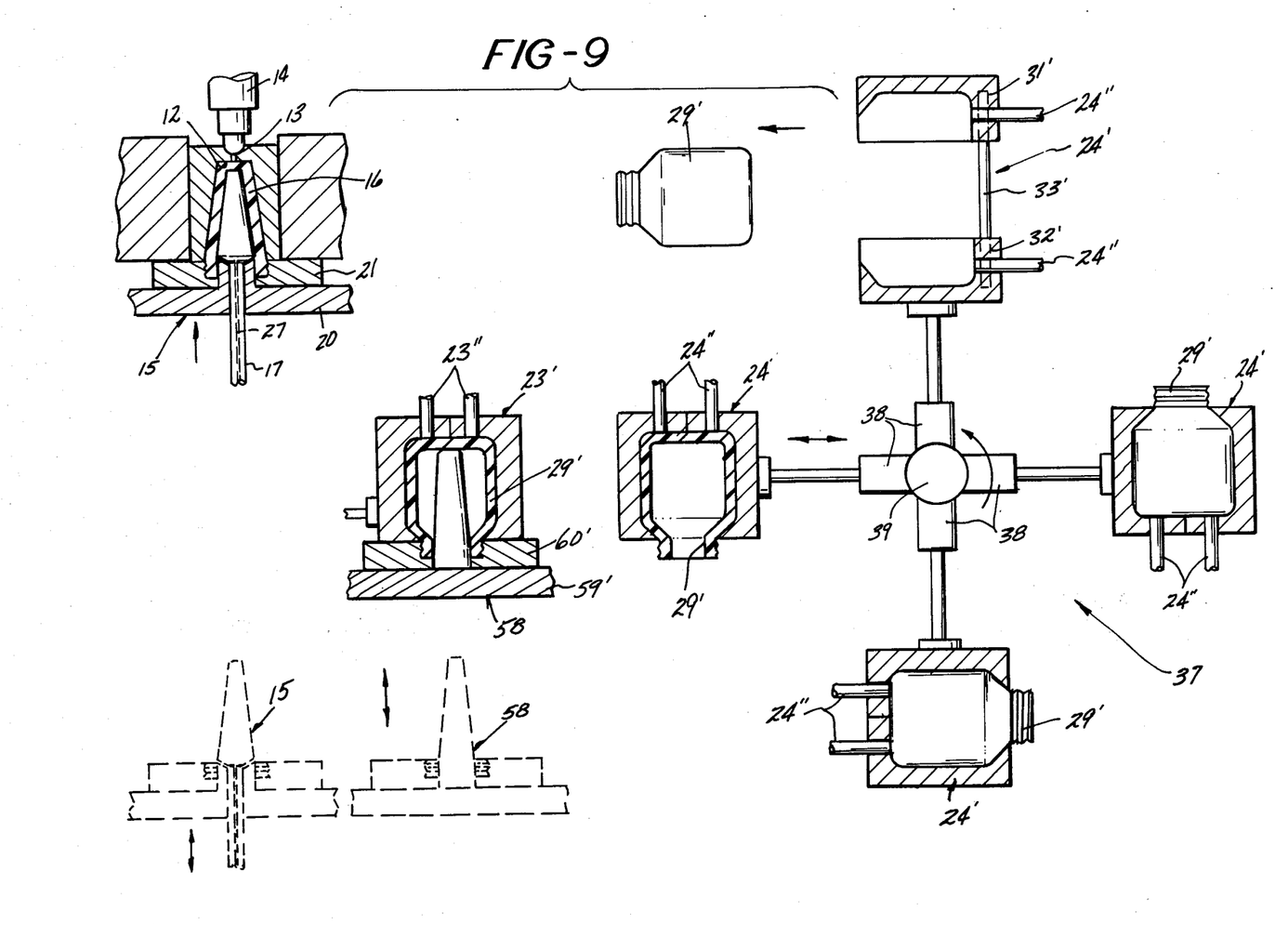
FIG. 9 is a sectional view showing rotary indexing finishing molds in accordance with an embodiment of this invention.

Yet a further modification of the operation is contemplated, wherein a plurality of retaining molds capable of lateral reciprocation in the same manner as retaining mold 24 in FIG. 1, are provided in addition to said retaining mold and are carried by an indexing device to provide a longer residence time of the final object in the mold. The indexing device may be any device which is capable of conveying these retaining molds in and out of position in the mold assembly. One such device is illustrated in FIG. 9, wherein a rotary indexing carousel 37 is shown carrying four retaining molds 24′ on extensible connecting arms 38 which radiate from a hub member 39 and through which vacuum conduits may be brought into communication, in a manner not shown, with molds 24′. Connecting arms 38 are reciprocable to provide the lateral movement for the finish molds, and may be proximally enlarged as illustrated to house a reciprocating means, such as, for example, a hydraulic cylinder. Naturally, other means of reciprocation which are known in the art would be suitable herein, and the invention is not limited to hydraulic power.

In operation, carousel 37 indexes a mold 24′ into position adjacent blow mold 23. Mold 24′ is coupled thereto by a coupling means, not shown, and extensible connecting arm 38 permits it to reciprocate in conjunction therewith. Mold 24′ is thus brought together with core 58. Upon locating the expanded parison within mold 24′ and disengaging it from core 15, mold 24′ bearing article 29′ is then indexed out of alignment with core 58 and moved in a counter-clockwise direction, in accordance with the figure, and the next empty mold takes its place. The mold travels to the position it assumes just before being recoupled with blow mold 23, at which point, article 29′ is removed.

Removal is conducted in the same manner as with retaining mold 24, as the molds of this embodiment are likewise separable into sections 31′ and 32′, respectively, which are reciprocable in and out of contact upon alignment means 33′. Actuating means, not shown, for the opening and closing of mold 24′ may comprise suitably placed cams, or hydraulic cylinders, as is customary for this type of device.

The above embodiment could be employed in conjunction with the embodiment of FIG. 8 to provide, where desirable, a further extended cooling time for the article. Other devices which are known to those skilled in the art may be employed in place of the aforenoted carrier assembly within the scope of this invention.

The method and apparatus disclosed above are susceptible to all of the changes and modifications disclosed with respect to the embodiment of FIGS. 1 – 2C, and all of such changes are encompassed herein.

The above method enables the adaptation of the conditions of cooling or other temperature conditioning to the particular material being processed and the performance of such conditioning, even when long time intervals are required, while retaining the operating economy of a conventional blow-molding process. The provision of an extended cooling or other conditioning cycle in a separate mold or series of molds enables the pursuit of both the molding and the cooling or other conditioning process without lengthening the overall operating cycle, as such conditioning may take place in stages that can occur simultaneously with other molding operations, rather than immobilizing the entire apparatus for the full period that is the sum of all such stages.

Figure 10:
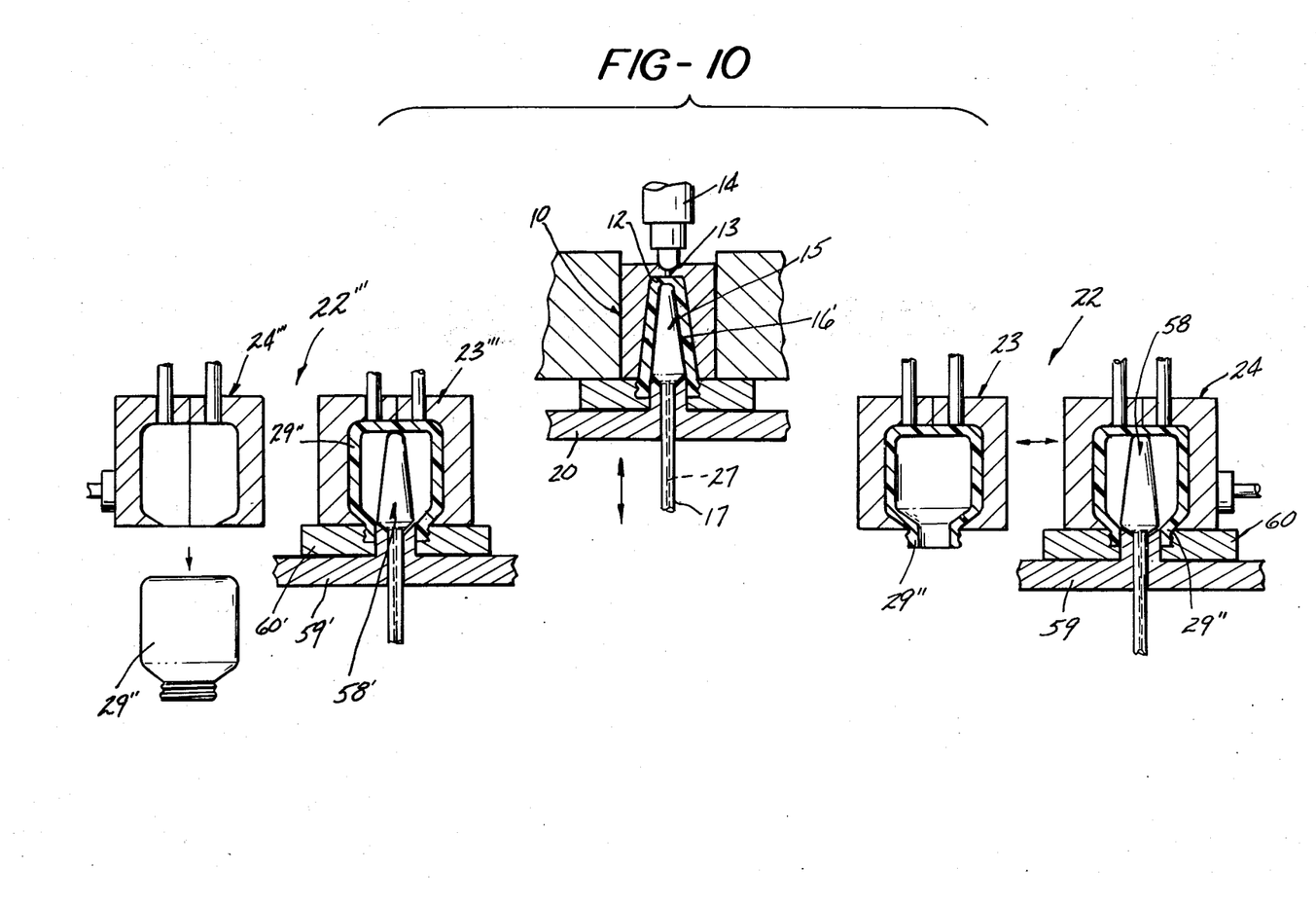
FIG. 10 is an elevation, partly in section illustrating a modification of the embodiment of FIG. 3.

If it is desired to increase the rate of production of a given machine or to use the injection unit thereof more efficiently, one may, in a further embodiment of the present invention, arrange to carry out the injection step in parison mold 10 simultaneously with the blowing step by providing two sets of molds such as molds 23 and 24 for each injection unit 14 and parison mold 10, as shown in FIG. 10, in which like numerals designate like parts. According to FIG. 10, one blow mold assembly is provided on each side of injection unit 14, designated by numerals 22 and 22‴, respectively. The parison is produced in the parison mold 10 and further processed in mold 23, as before described in connection with FIG. 3. However, in this embodiment, as mold 23 is shifted away from the blow core 15, blow mold 23‴, located at the opposite side thereof, is shifted into alignment with the blow core.

Therefore, the parison molded next after the one that has been transferred into mold 23 is placed within mold 23‴ by blow core 15, blown into conformance therewith and shifted away while within mold 23‴, all as described above. The blown article 29″ produced thereby in mold 23‴ may then be further processed by means of core assembly 58′ and mold 24‴, in the same manner as previously described in connection with core assembly 58 and mold 24, in FIGS. 3 and 4A – 4B. It is seen that, in this manner, a parison 16 may be produced while a parison that has been produced just before is being processed in a blow mold, such as blow mold 23‴, illustrated herein. Accordingly, the time interval of parison production overlaps that of blowing for each cycle, and the injection unit 14 is used practically without interruption.

Naturally, the present invention is quite versatile and a wide variety of articles of varying configurations may be readily produced. If desired, the present invention may be performed on a continuous basis or intermittently. For example, as noted above, the process may be interrupted at a convenient stage, the product stored or shipped to another location and the process subsequently completed, such as when shipping the molded parison from one location to another.

The invention may be embodied in other forms or carried out in other ways without departing from the spirit or essential characteristics thereof. The present embodiments are therefore to be considered as in all respects illustrative and not restrictive, the scope of the invention being indicated by the appended claims, and all changes which come within the meaning and range of equivalency are intended to be embraced therein.

What is claimed is:

1. In a method for the preparation of hollow objects of moldable organic material by providing a parison in a formable condition, locating said parison in a blow mold, and expanding said parison within said blow mold to form an expanded parison, the improvement which comprises: providing a temperature adjusting retaining mold spaced laterally from said blow mold; transferring said expanded parison to said retaining mold by means of a core including the steps of separating said expanded parison while on said core from said blow mold, aligning said core with expanded parison thereon and said retaining mold by relative lateral movement, engaging said core with expanded parison thereon and said retaining mold by relative axial movement to seat same within said retaining mold and placing said expanded parison in surface contact with the walls of the retaining mold through an applied force; then separating said expanded parison from said core by relative axial movement and permitting said expanded parison to reside within said retaining mold in surface contact with the walls of the retaining mold for a predetermined period of time sufficient to adjust the temperature thereof before removal therefrom said applied force being continued through at least a part of said predetermined period of time has been inserted.

2. The method of claim 1 wherein the parison is cooled while residing within said retaining mold.

3. The method of claim 1 wherein the parison is heated while residing within said retaining mold.

4. The method of claim 1 including the steps of expanding said parison within said blow mold on a blow core, retaining said expanded parison within said blow mold while separating said blow core and said blow mold from each other, aligning said blow mold containing said expanded parison with a transfer core, transferring said parison thereto, and locating said transfer core bearing said expanded parison within a retaining mold.

5. The method of claim 4 wherein said parison is held in a neck mold while upon said blow core.

6. The method of claim 4 wherein said transferring step is repeated by the transfer of the parison to successive transfer cores for locating within successive retaining molds.

7. The method of claim 6 wherein said parison is subjected to predetermined controlled temperature variation in all of the retaining molds.

8. The method of claim 4 wherein said parison is held in a neck mold while upon said transfer core.

9. The method of claim 1 wherein said steps are conducted concurrently.

10. The method of claim 1 wherein said expansion is performed by the application of fluid pressure.

11. The method of claim 1 wherein said parison is held in a neck mold while upon said core.

12. The method of claim 1 wherein the parison is formed on a blow core within a parison die spaced laterally from said blow mold, wherein said blow core with formed parison thereon and said parison die disengage by relative axial movement, and wherein said blow mold is aligned between said parison die and blow core by relative lateral movement.

13. The method of claim 12 wherein said parison is heated in said parison die.

14. The method of claim 12 wherein said parison is formed by pressure molding in said die.

15. The method of claim 12 including transferring said blow core bearing said parison from said parison die to said blow mold by relative axial movement of said blow core.

16. The method of claim 12 wherein the parison is formed on said blow core by molding at least one additional layer of plastic over a previously formed liner supplied to said blow core.

17. The method of claim 16 including the engagement with said blow core of a dispenser containing a quantity of said previously formed liners.

18. The method of claim 1 wherein said parison is a previously formed parison transferred from a dispenser containing a quantity of same.

19. The method of claim 1 including the transfer of the expanded parison to successive retaining molds.

20. The method of claim 19 wherein said parison is subjected to predetermined controlled temperature variation in all of the retaining molds.

21. The method of claim 1 further including the steps of retaining said expanded parison in said retaining mold while separating said core therefrom; and removing said expanded parison from said retaining mold.

22. The method of claim 21 wherein said retaining mold containing said parison is indexed through a plurality of positions after removal of said core therefrom.

23. The method of claim 21 wherein removal is conducted by opening said retaining mold.

24. The method of claim 23 wherein said expanded parison is transferred to a transfer device before final removal.

25. The method of claim 24 wherein said transfer device comprises at least one transfer finger and said expanded parison is indexed from the area of transfer from said core to a removal area.

26. The method of claim 1 including the steps of axially aligning the core with expanded parison thereon and said retaining mold by relative lateral movement, and engaging said core with expanded parison thereon and said retaining mold by relative axial movement.

27. In a method for the preparation of hollow objects of moldable organic plastic material by providing a parison in a formable condition, locating said parison in a first mold, and at least partially expanding said parison within said first mold to form an expanded parison, the improvement which comprises: providing a temperature adjusting retaining mold spaced laterally from said first mold; transferring said expanded parison to said retaining mold by means of a core including the steps of separating said expanded parison while on said core from said frist mold, aligning said core with expanded parison thereon with said retaining mold by relative lateral movement, engaging said core with expanded parison thereon and said retaining mold by relative axial movement to seat same within said retaining mold and placing said expanded parison in surface contact with the walls of the retaining mold through an applied force; then separating said expanded parison from said core by relative axial movement and permitting said expanded parison to reside within said retaining mold in surface contact with the walls of the retaining mold for a predetermined period of time sufficient to adjust the temperature thereof before removal therefrom, said applied force being continued through at least a part of said predetermined period of time.

28. A method according to claim 27 wherein said parison is transferred to a further operation after said temperature adjustment step substantially at the temperature imposed by said retaining mold.

29. The method of claim 27 including the steps of axially aligning the core with expanded parison thereon and said retaining mold by relative lateral movement, and engaging said core with expanded parison thereon and said retaining mold by relative axial movement.

30. The method of claim 27 wherein the parison is formed on a blow core within a parison die spaced laterally from said first mold, wherein said blow core with formed parison thereon and said parison die disengage by relative axial movement, and wherein said first mold is aligned between said parison die and blow core by relative lateral movement.

31. The method of claim 30 including transferring said blow core bearing said parison from said parison die to said first mold by relative axial movement of said blow core.

* * * * *

UNITED STATES PATENT AND TRADEMARK OFFICE
CERTIFICATE OF CORRECTION

PATENT NO. : 4,115,494
DATED : September 19, 1978
INVENTOR(S) : Emery I. Valyi

It is certified that error appears in the above-identified patent and that said Letters Patent are hereby corrected as shown below:

In Column 6, line 25, change "though" to read ---Though---.

In Column 11, lines 33 and 34, claim 1, delete "has been inserted".

In Column 11, line 51, claim 6, change "locating" to ---location---.

Signed and Sealed this

Nineteenth Day of June 1979

[SEAL]

Attest:

RUTH C. MASON
Attesting Officer

DONALD W. BANNER
Commissioner of Patents and Trademarks